United States Patent
Dziong

(10) Patent No.: US 6,625,155 B1
(45) Date of Patent: Sep. 23, 2003

(54) MODEL-BASED ADMISSION CONTROL ADJUSTMENT IN DATA NETWORKS

(75) Inventor: Zbigniew Marek Dziong, Atlantic Highlands, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/407,779

(22) Filed: Sep. 28, 1999

(51) Int. Cl.⁷ ............................................... H04L 12/28
(52) U.S. Cl. ..................................... 370/395.2; 370/230
(58) Field of Search ................................ 370/229, 230, 370/232, 233, 234, 235, 360, 395.1, 397, 395.2, 399, 395.21, 395.3, 395.31, 395.41, 395.43, 395.57

(56) References Cited

U.S. PATENT DOCUMENTS

| | | | |
|---|---|---|---|
| 4,912,702 A | * 3/1990 | Verbiest | 370/84 |
| 5,315,586 A | 5/1994 | Charvillat | |
| 5,357,507 A | 10/1994 | Hughes et al. | |
| 5,448,559 A | * 9/1995 | Hayter et al. | 370/60.1 |
| 5,570,360 A | * 10/1996 | Klausmeier et al. | 370/60 |
| 5,583,857 A | * 12/1996 | Soumiya et al. | 370/233 |
| 5,862,126 A | 1/1999 | Shah et al. | |
| 5,872,771 A | 2/1999 | Park et al. | |
| 5,878,029 A | 3/1999 | Hasegawa et al. | |
| 5,881,049 A | 3/1999 | Beshai et al. | |
| 5,917,804 A | * 6/1999 | Shah et al. | 370/230 |
| 6,058,114 A | * 5/2000 | Sethuram et al. | 370/397 |
| 6,097,722 A | * 8/2000 | Graham et al. | 370/395 |
| 6,324,166 B1 | * 11/2001 | Yokoyama et al. | 370/234 |
| 6,459,681 B1 | * 10/2002 | Oliva | 370/232 |
| 6,490,249 B1 | * 12/2002 | Aboul-Magd et al. | 370/232 |

* cited by examiner

Primary Examiner—Wellington Chin
Assistant Examiner—Brenda Pham

(57) ABSTRACT

Tuning for connection admission control (CAC) algorithms in broadband ATM networks is accomplished using an overbooking technique based on aggregate effective bandwidth, AEBW, as an approximation to required bandwidth for given levels and classes of network traffic. An overbooking gain factor, $\alpha^r$ is developed and used for a succeeding time interval using a model-based approach illustratively using estimates of mean and variance for selected measured parameters of the aggregate cell process for the current state of connections. Well-known Kalman filtering techniques are advantageously applied to optimally estimate the mean and variance values. It also proves useful to include longer term statistics in the mean and variance calculation and to modulate the aggressiveness of overbooking based on actual system performance measures (e.g. cell losses).

18 Claims, 3 Drawing Sheets

AEBW: AGGREGATE EFFECTIVE BANDWIDTH

MODEL-BASED ADMISSION CONTROL ADJUSTMENT IN DATA NETWORKS

RELATED APPLICATIONS

The present invention is related to the following concurrently filed applications: Admission Control Adjustment in Data Networks Using Maximum Cell Count, by Z. Dziong and W. Lau; and Learning-Based Admission Control Adjustment in Data Networks, by Z. Dziong and M. Ji. Each of these concurrently filed applications is assigned to the assignee of the present invention, and each is hereby incorporated by reference into the present application.

1. Field of the Invention

The present invention relates to high-speed data networks, such as Asynchronous Transfer Mode (ATM) networks. More particularly, the present invention relates to Admission Control for bandwidth management and congestion control in such networks. Still more particularly, the present invention relates to the use of Connection Admission Control (CAC) adjustments in ATM networks using network measurement data to further control and tune an analytical CAC system.

2. Background of the Invention

In broadband integrated services networks, e.g., those using asynchronous transfer mode (ATM) systems and techniques, information is packetized in fixed length "cells" for statistical multiplexing with other traffic for transmission over high-bit-rate channels. Such networks are connection oriented, so a connection must be established before transmission begins. Moreover, these connections are usually subject to contracts between a network operator and users of the network. To ensure quality of service (QoS) consistent with these contracts, connection admission control (CAC) techniques are typically employed in management of such networks. Generally, CAC algorithms determine whether a new virtual channel connection should be admitted to the network based on network status—such as available resources, cell loss performance—and contract parameters (e.g., mean traffic rate and peak traffic rate). See generally, Dziong, Z., *ATM Network Resource Management*, McGraw-Hill, 1997.

Because of the complex variety of connection types and services, and consequent difficulty in ascertaining complete and current information regarding the actual state of ATM networks, and because of possible adverse consequences of failing to honor QoS guarantees in customer contracts, many network operators have chosen to use CAC algorithms that are quite conservative. Most CAC algorithms are designed for worst-case source behavior. Moreover, analytical models applied in these algorithms are also conservative—to account for the difficulty in achieving exact modeling of the connection aggregate process. Such conservative approaches in many cases tend to offset statistical multiplexing gains and other system efficiencies available in ATM networks.

Some have proposed using actual network measurements (such as traffic level and cell-loss characteristics in light of corresponding QoS constraints) to adjust CAC mechanisms in an attempt to more fully use network resources. See, for example, Bensaou, B.; Lam, S. T. C.; Chu, H. and Tsang, D. H. K., "Estimation of the Cell Loss Ratio in ATM Networks with a Fuzzy System and Application to Measurement-Based Call Admission Control," *IEEE/ACM Transactions on Networking*, VOL. 5, NO. 4 (August 1997), pp. 572–584; Gibbens, R. J., Kelly, F. P., and Key, P. B., "A decision-theoretic approach to call admission control in ATM networks," *IEEE Journal on Selected Areas in Communication*, 13(6):1101–1114 (1995); and Saito, H. "Dynamic call admission control in ATM networks, *IEEE Journal on selected Areas in Communication*, 9(7):982–989 (1991).

Thus far however, attempts to use network operating measurements have proven difficult in network administration, especially in respect of their incorporation in CAC processes. A particular difficulty arises in some prior art CAC processes in efficiently treating operations in networks exhibiting a wide variety of traffic types with a concomitant variety of QoS constraints. High bandwidth efficiencies through CAC tuning have not been readily available without high precision measurements.

SUMMARY OF THE INVENTION

The present invention overcomes limitations of prior art CAC algorithms and achieves a technical advance, as described in connection with illustrative embodiments presented below.

In accordance with one aspect of the present invention, the concept of aggregate effective bandwidth, AEBW, is used to provide a useful approximation to required bandwidth for given levels and classes of network traffic. AEBW is used in deriving an allowed level of overbooking—expressed in terms of an overbooking gain, $\alpha^t$.

In accordance with another aspect of the present invention, a model-based system and method for CAC model tuning estimates selected parameters of the aggregate cell process for the current state of connections using measurements made at individual ATM switches. These estimates are then used to evaluate currently allowed overbooking gain, which is used in the next CAC decision.

In an illustrative embodiment, estimates of mean and variance of the aggregate cell rate process, $M_k$, $V_k$ for the current state k are used to estimate allowed overbooking gain, given by $$\alpha_k^t = \frac{f_{AEBW}(M_k^d, V_k^d)}{f_{AEBW}(\hat{M}_k, \hat{V}_k)} - 1, \tag{1}$$

where $M_k^d$, $V_k^d$ and $\hat{M}_k$, $\hat{V}_k$ are declared and estimated values for connection state k, respectively. The function $f_{AEBW}$ is an analytical model for effective bandwidth evaluation.

In estimating aggregate cell rate mean and variance, M, V it proves useful to employ cell count samples over 100 ms (or a shorter time interval, where convenient). Then well-known Kalman filtering techniques are advantageously applied to optimally estimate M and V based on measurements and declarations. Because the Kalman filter also assesses error in the estimate, it proves convenient to design safety margin in calculation of the over-booking gain.

It also proves useful in some cases to include longer-term statistics in the mean and variance calculation and to modulate the aggressiveness of the overbooking based on actual system performance measures (e.g. cell losses). In some cases, a learning model can be employed to further or alternatively modulate this aggressiveness.

BRIEF DESCRIPTION OF THE DRAWING

The above-summarized invention will be more fully understood upon a consideration of the following detailed description taken together with the attached drawing, wherein.

DETAILED DESCRIPTION

Figure 1:
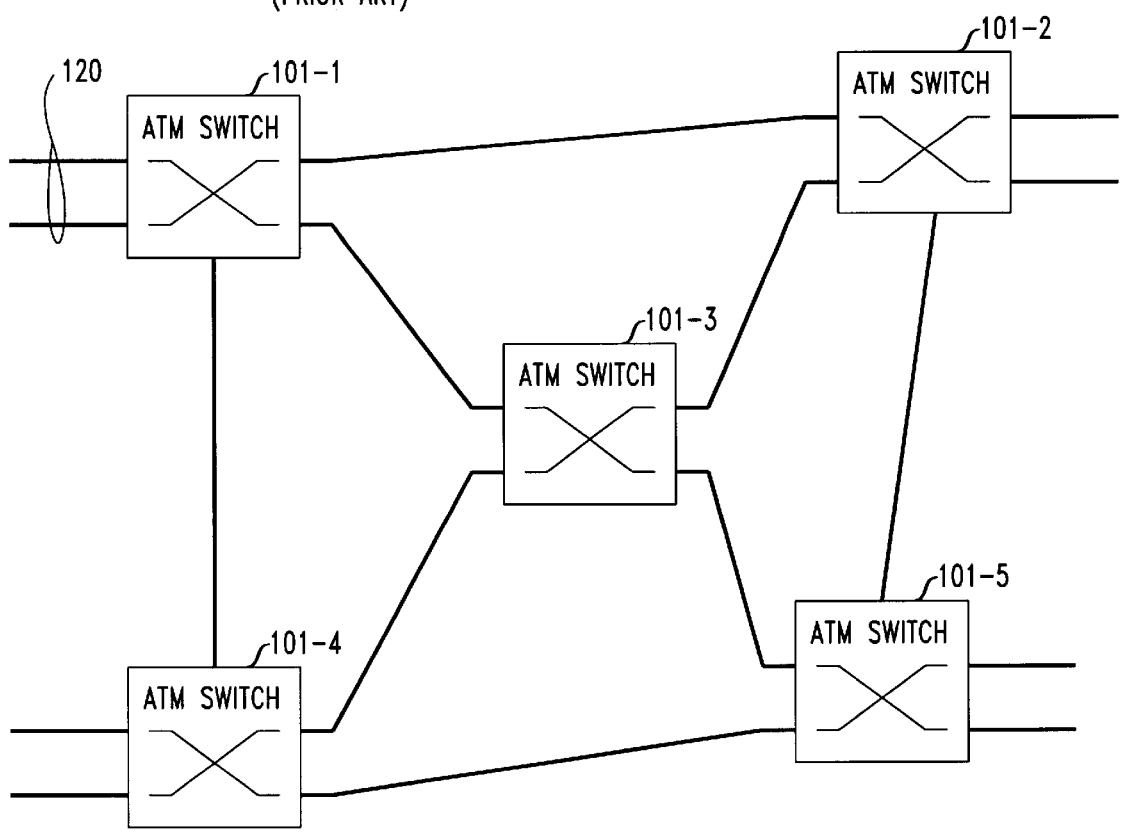
FIG. 1 shows a simplified representation of an overall network of interconnected ATM switches in which illustrative embodiments of the present invention find application.

FIG. 1 shows a simplified representation of a network of ATM switches interconnected by data links in which illustrative embodiments of the present invention will find application. Each of the ATM switches $101\text{-}i$, $i=1, 2, \ldots, N$ includes a plurality of input ports receiving input traffic streams from respective data sources, including output ports of other switches. Connections established through individual input ports generally reflect a variety of traffic forms, including permanent virtual connections (PVCs) or switched virtual connections (SVCs). Such input connections through input ports are represented collectively as 120 for illustrative switch 101-1. Though the number of switches, N, is shown as being equal to five for the illustrative network of FIG. 1, it will be understood that N may be any integer consistent with geographic and traffic requirements of a network. In general, each individual input stream will be subject to quality of service (QoS) constraints such as limits on cell loss, maximum cell delay and other such constraints known in the art.

Each ATM switch $101\text{-}i$ in FIG. 1 has a plurality of output ports, each connected over physical links to respective input ports of other ATM switches $101\text{-}i$, or to other networks or to multiplexers, terminals or other terminating devices or systems. Each of these output ports, in turn, will generally support a plurality of virtual connections that include links to the connected following switch. Additionally, of course, ATM switches $101\text{-}i$ shown in FIG. 1 typically comprise processor, buffering, switching fabric and other facilities normally found in ATM network switches.

Each ATM switch $101\text{-}i$ advantageously comprises facilities for monitoring switch and link activities and for controlling link operation under the direction of switch operating software executing on a processor at the switching node. Those skilled in the art will recognize that existing switch software is readily modified, based on present teachings, to achieve the innovations and advantages of the present invention. In some cases a separate CAC tuning module directed to receiving traffic input and measurement signals and supplying data and control information to existing CAC algorithm software will prove preferable. In any event, functionality relating to CAC is advantageously adjusted or tuned in accordance with present inventive teachings, as described below.

As is well known, control of switch functionality in switches $101\text{-}i$ in FIG. 1 is advantageously grouped in so-called control and management planes in the switches. In accordance with common reference models for ATM network operations (such as CCITT Rec. I.321, 1991), communications protocols are referred to layers, including physical layer, ATM layer and ATM Adaptation Layer (AAL)—as well as higher layers. Each of these layers is then subject to management functions exercised by control and management planes, such controls typically include policing mechanisms for ensuring that cell streams conform to existing user contracts and scheduling algorithms for output ports. The control plane is typically used to signal between management objects at different physical locations, such as network nodes and user premises. See, for example, the above-cited Dziong book, especially pp. 5–9.

CAC algorithms usually decompose a connection admission problem into a number of link problems each dealing with traffic conditions and QoS parameters associated with links connecting an output port at one ATM switch to an input port at another ATM switch. Using well known monitoring, signaling and control functions of the aforementioned control and management planes, CAC algorithms at individual ATM switches control admission (or not) of newly presented connections (or connections seeking renegotiated service levels). As noted above, however, these CAC algorithms are often unduly conservative in their execution and therefore subject to operation at higher efficiencies when adjusted or tuned in accordance with the present inventive teachings.

Figure 2:
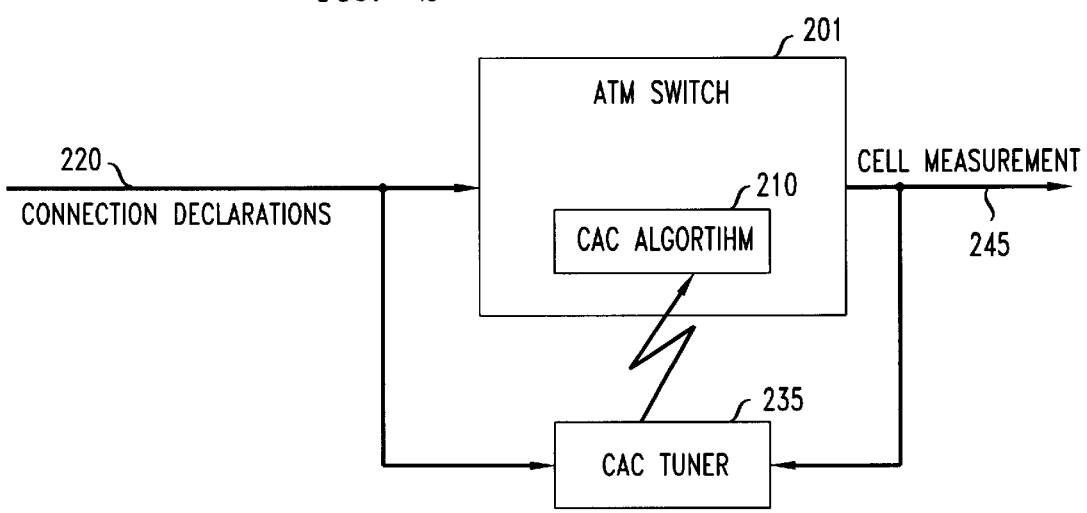
FIG. 2 shows a CAC tuner operating in conjunction with a switch-based CAC algorithm in accordance with one aspect of the present invention.

FIG. 2 shows an overall representation of an ATM switch 201 receiving connection declarations over input 220. Such declarations typically include traffic descriptors and QoS requirements, as is known in the art. This illustrative input information is used for, among other things, making CAC decisions using CAC algorithm 210. Some or all of the information appearing on input 220, as well as information relating to cell process performance at output ports, such as port 245 of switch 201, are also supplied to CAC tuner 235 in accordance with an aspect of the present invention. CAC tuner 235, operates in accordance with a CAC tuner algorithm, which may assume any of a number of particular designs using different particular input parameters, is used to modify the operation of the CAC algorithm 210. The manner in which such tuning or modification is performed in accordance with illustrative embodiments of the present invention will be described below.

A Definitional Framework for Viewing CAC Adjustments

Before proceeding with a detailed description of illustrative control algorithms, it proves convenient to define terms used in the following description, to more formally state the CAC adjustment problem and to describe certain preliminary aspects of embodiments of the present invention.

Figure 3A:
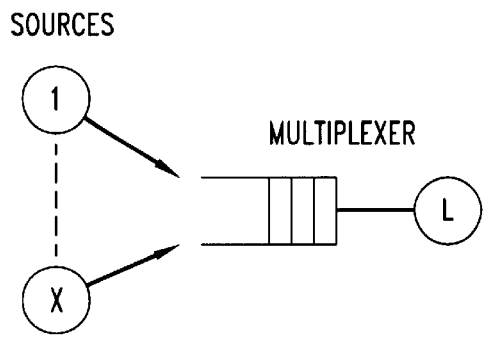
FIGS. 3A and 3B help illustrate the derivation of the concept of aggregate effective bandwidth, AEBW.
Figure 3B:
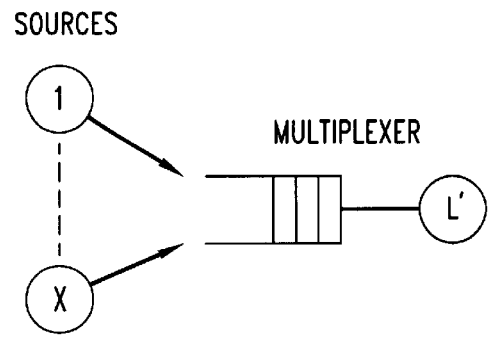

A first concept to be introduced is that of aggregate effective bandwidth, AEBW. For ease of presentation we consider first a one-priority case (a generalization to the multi-priority case will be given below). The definition is illustrated in FIGS. 3A and 3B. In FIG. 3A a plurality of connections are served in an ATM multiplexer characterized by link speed L. Under the assumption that the QoS constraints are not violated, we reduce the link speed to value L', as in FIG. 3B, at which speed the QoS constraints are tightly met. In other words, any further reduction of the link speed below L' would violate one or more of the QoS constraints. In the following we refer to L' as aggregate effective bandwidth, AEBW.

It also proves convenient to introduce the following notation for values associated with a particular switch output port for a particular state of connections:

$D^d$—nominal effective bandwidth allocated by CAC for priority j aggregate traffic based on source declared parameters (consistent with policing parameters—worst case);

$D^{ap}$—maximum actual effective bandwidth (based on exact model) required by priority j worst case aggregate traffic (consistent with policing parameters);

$D^a$—actual effective bandwidth required by aggregate traffic (smaller than $D^{ap}$ if sources' activity is intermittent and/or the declared parameters were "oversized");

$D^t = D^d/(\alpha^t + 1)$—tuned effective bandwidth for aggregate traffic; ($\alpha^t$ is referred to as the over-booking gain);

$D^{ov} = D^{ap} - D^a$—bandwidth available for over-booking;

$E^{CAC} = D^d - D^{ap}$—CAC model error; (this is most likely positive);

$E^t = D^t - D^a$—tuned CAC error; (an objective is to keep this error small but positive).

Figure 4:
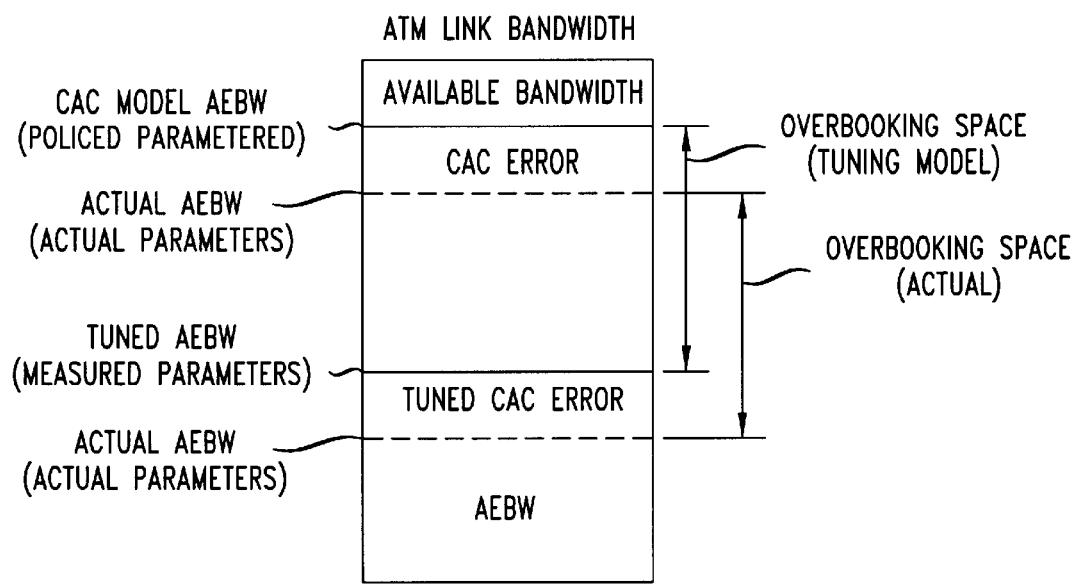
FIG. 4 shows available bandwidth in relation to total link bandwidth, AEBW and other bandwidth components.

The relation between these values is illustrated in FIG. 4 for a particular set of connections at a particular moment (assuming one priority class). Observe that the difference between the nominal effective bandwidth, $D^d$, and the actual bandwidth, $D^a$, is caused by two independent factors: CAC model error and source inactivity (especially PVCs which seek parameters based on peak activity periods, but which generally do not require these peak parameters at all times). For these reasons it is generally appropriate to consider the following objectives of CAC tuning:

OB1—reduce the CAC algorithm error

OB2—utilize the bandwidth available for over-booking (over-booking bandwidth);

OB3—reduce the CAC error and utilize the over-booking bandwidth

While the third objective is generally a preferred one, some solutions are limited to the second objective because of measurement or model limitations. Note that the first objective requires that all sources are using maximum bandwidth at the same time; this situation is not only unlikely but also difficult to identify.

CAC Algorithm Tuning Generally

With the foregoing motivation, analysis tools and preliminary approaches, it proves useful to divide CAC tuning approaches into two categories: direct and indirect. Indirect tuning is based on measurement of parameters that are not directly transferable into effective bandwidth. In this case the required effective bandwidth is evaluated based on an analytical CAC tuning model that uses measurements and, in some cases, the declared parameters of the sources. Such a CAC tuning model can be chosen for consistency with the CAC model in the primary CAC process being tuned, but, in general, the tuning model and the model used in the primary CAC process can be independent. Illustrative indirect systems and methods for CAC tuning in accordance with embodiments of the present invention will be presented below in connection with FIG. 5. There, a tuning model comprising elements 530, 550, 555 and 560 receives measurement and connection declaration information and derives tuning control information for tuning the CAC model used in a switch—such as those illustrated in FIGS. 1 and 2. Other indirect approaches are described, for example, in the above-cited book by Dziong, and paper by Gibbens, et al.

Note that an indirect approach can only address objective OB2 given above. By contrast, direct approaches to CAC tuning are based on measurements from which one can directly (or almost directly) evaluate the equivalent bandwidth required by connections. In this case objective OB3 given above can be addressed.

For simplicity of presentation, the model-based CAC tuning algorithms described below are described initially in contexts that consider connections in only one priority class; generalization to cases of multiple priorities and weighted fair queuing are described later.

Model-Based CAC Tuning

Figure 5:
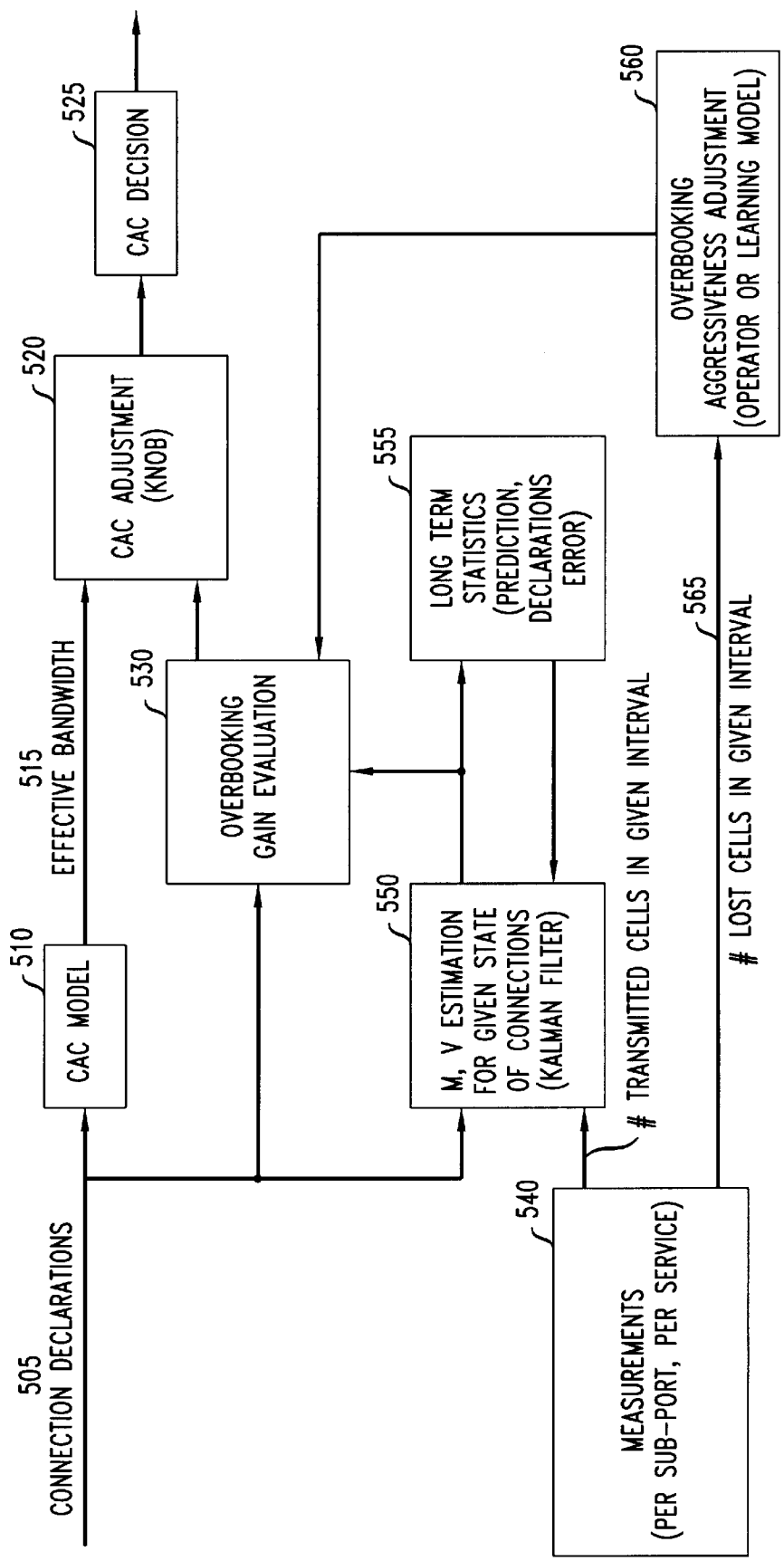
FIG. 5 illustrates in greater detail a CAC adjustment arrangement of the type shown generally in FIG. 2.

An illustrative architecture for model based CAC tuning in accordance with the present invention is shown in FIG. 5. For this context, evaluation of the over-booking gain, $\alpha^t$, is based on an analytical model supplied with measured parameters including average cell rates, $\overline{M}$. We denote the user-declared counterpart of $\overline{M}$ as M.

In relation to the system of FIG. 5, connection declarations are presented on input 505 and applied to CAC model 510, where the effective (untuned) bandwidth is initially determined using the normal processes of the particular CAC algorithm. It should be recalled that different networks may use different particular CAC algorithms.

In achieving the desired CAC tuning, measurements are received from the normal measurement processes operating in the control and management planes of the ATM protocol model, as reflected by block 540 in FIG. 5. The particular measurements for each port and service, and their use, will vary to meet particular requirements. Generally, such measurements will include at least some of: the number of cells in a particular interval, the number of lost cells in a particular interval, and cell transfer delay (CTD). Illustratively, these measurements will relate to cell counts over a short period, e.g., 100 milliseconds or less. Other secondary parameters based on these measurements that prove useful in appropriate cases, include those determined for longer intervals, e.g., one or more seconds. Illustrative longer-term cell process may include average cell rate, cell rate variance, cell rate autocovariance and higher rate moments, such as the fourth moment. Similarly, performance parameters will illustratively include one or more of cell loss rate, average cell rate, and cell delay variation.

In the illustrative embodiment shown in FIG. 5, the measurements for the number of cells in an interval are applied to block 550 for calculation of the mean and variance of these measured values, illustratively using well-known Kalman filtering techniques. See, for example, Dziong, Z; J. Marek; and L. G. Mason, "A Framework for Bandwidth Management in ATM Networks—Aggregate Equivalent Bandwidth Estimation Approach," *IEEE/ACM Trans. on Networking*, vol. 5, no. 1, February 1997, pp. 134–147. Long term statistics relating, for example, to prediction and declaration error are maintained in block 555 and are exchanged with the mean and variance estimation block 550.

When such mean and variance values are determined in block 550 they are supplied to the overbooking gain evaluation block 530. Likewise, illustrative lost cell measurements for intervals are advantageously supplied to an over-booking aggressiveness block 560. There, under the control of an operator or using the illustrative learning model (to be described below), the aggressiveness of the overbooking algorithm in block 530 is modulated. In appropriate cases the aggressiveness adjustment may be eliminated. Then, the overbooking gain, $\alpha^t$, is output from block 530 for application to CAC adjustment block 520. This CAC adjustment can be accomplished automatically or under operator control. Finally, the adjusted CAC decision is made at block 525 using the tuned CAC model. Further details of the system and process shown in FIG. 5 are given below.

Generalization to Multi-Priority Systems

Thus far, it has been assumed that an ATM switch output port has one priority queue. Generalization of the model-based approach described above to multi-priority systems with absolute priority is straightforward. In this case the measurement-based model will illustratively follow the structure of the nominal CAC model as far as bandwidth allocation to different priorities is concerned. Parameters are illustratively measured on a per priority/service basis and the model then takes these priorities into account when making adjustments. In particular, evaluation of bandwidth allocated to constant bit rate (CBR) and variable bit rate (VBR) sources is typically separated.

Other Considerations in Model-Based Systems

As compared to other algorithms described in the incorporated patent applications, the model-based CAC tuning algorithms of the present invention usually proves to be of medium complexity. Such complexity is associated mainly with the estimation of the mean and variance of the cell process.

Model-based algorithms employed in embodiments of the present invention illustratively use cell counts over relatively short interval (e.g. 100 ms or shorter) and performance measure (e.g. cell losses over 15 min. interval).

Complementary Features of Various Algorithms

As will be appreciated by those skilled in the art, the CAC tuning systems and methods described in the present application, and those described in the incorporated patent applications, are complementary in many ways and can be used cooperatively to improve the overall tuning result. For example the learning approach described in the incorporated application entitled Learning-Based CAC Adjustment in ATM Networks can be used to modify the aggressiveness of the model-based approach in order to compensate for the model error.

In the following we provide a further description of an algorithm combining the model-based algorithms described above and the learning algorithms described in the incorporated patent application entitled Learning-Based CAC Adjustment in ATM Networks. The organization of the algorithm and its component modules are those shown in FIG. 5, with the aggressiveness adjustment employing the incorporated learning model teachings.

Input to the "M, V Estimation" Module

Measurements and other parameters:
  Periodic 100 ms cell count per service (CBR, VBR-rt, VBR-nrt) per sub-port.
  After each connection acceptance or release:
    policing parameters of the connection (PCR,BT,SCR)
    nominal bandwidth allocated to the connection aggregate (per service class) by the CAC algorithm.

Estimation of Mean and Variance

The estimation of mean and variance is generally in accordance with background provided in the above-cited book by Dziong (see generally, chapter 4, and especially pp. 73–76), with some modifications in order to reduce complexity and make the algorithm more robust. One such modification employed to advantage in the currently described algorithm is to use a fixed interval, T, for updating the Kalman filter state. This interval advantageously is not shorter than two or more seconds in order to provide a sufficient number of samples for variance estimation. The interval should not be too long, since we will assume that the cell process of a given set of connections is approximately stationary within two subsequent intervals. Then, the parameters of the Kalman filter input will be calculated every T based on the following:
  Calculated measured mean, $\overline{M}$, and variance, $\overline{V}$, from samples in the interval T (chosen as described).
  Predicted mean, m, and variance, v, of connections added or removed during the estimation period T (based on declarations and long term statistics) together with variance of the prediction errors (based on declarations and long term statistics).

Based on this input the Kalman filter provides an optimal estimate of the mean $\hat{M}_k$ and variance $\hat{V}_k$ for the k-th interval T. Additionally the variance of the estimation errors is also given. The above procedure should be executed for each considered service (CBR, VBR-rt, VBR-nrt).

Influence of the Sampling Period on Variance

As described, the samples of cell rate are derived from periodic cell counts. While using these samples for cell rate mean estimation is straightforward, a bias can be introduced in estimating variance. The following discussion provides formulae to compensate for any such bias. Let us start from one on-off source characterized by: peak rate, P, average "on" time, $1/\alpha$, average "off" time, $1/\beta$, and resulting probability of being in "on" state, $p=\beta/(\alpha+\beta)$. The variance of such a process is given by $$V = P^2 p(1-p), \quad (2)$$

which could be estimated closely if instantaneous samples of cell rate were available. Now let us consider a modified process defined by the samples which are averages of cell rate over a period T. In general it can be shown that the variance, V' of this modified process is given by $$V'(T) = \frac{1}{T^2} \int_0^T \int_0^T \tau(t, u) \, dt \, du \quad (3)$$

where $\tau(t,u)$ is the autocovariance function of the original process. The autocovariance function for the on-off process is given by $$\tau(t,u) = V e^{-|t-u|/T_c} \quad (4)$$

where $T_c = 1/(\alpha+\beta)$. By applying Eq. 4 in Eq. 3 it can be shown that the variance of the modified on-off process can be expressed as $$V'(T) = 2V\left[\frac{T_c}{T} + \left(\frac{T_c}{T}\right)^2 \left(e^{\frac{T}{T_c}} - 1\right)\right] \quad (5)$$

It can also be shown that, as expected, variance of the modified process approaches zero when $T \to \infty$ and V when $T \to 0$. This feature can be interpreted as filtering of the original process.

The above result can be used to estimate the variance of the measured aggregate connection process in the following way. First, based on declared connection parameters evaluate the filtering factor, $\phi^d$, for the sampled declared process:

$$\phi^d = \frac{V^{d'}(T)}{V^d} \quad (6)$$

Then, assuming that the same factor applies to the measured process, approximate the measured variance, $\overline{V}$, as follows $$\overline{V} = \frac{\overline{V}'(T)}{\phi^d} \quad (7)$$

where $\overline{V}'(T)$ is the measured variance of the process sampled with T cycle.

Over-booking Gain Evaluation

The over-booking gain is advantageously determined based on an approximation which is using a linear combination of mean cell rate and root-square of variance (also variance without root-square will be used in some applications) for effective bandwidth calculation:

$$AEBW = \theta M + \kappa \sqrt{V} \tag{8}$$

where $\theta$ and $\kappa$ are pre-evaluated coefficients. Such an approach has been applied in other contexts previously. By applying this approximation to our problem we arrive at the following formula for the over-booking gain $$\alpha_k^{t'} = \frac{\theta M_k^d + \kappa \sqrt{V_k^d}}{\theta \hat{M}_k + \kappa \sqrt{\hat{V}_k} + R} - 1 \tag{9}$$

where R is bandwidth reserved for the estimation error calculated from this error variance provided by the Kalman filter. Note that the applied approximation for effective bandwidth allocation is used only to evaluate a ratio of two effective bandwidths; a high degree of accuracy is not critical in this case.

In general the over-booking gain calculated based on the k-th interval estimation will be used in the next interval (k+1) as a prediction. Exceptions will include the case for which there would be no new call arrivals or departures during the last two intervals, i.e. the (k−1)th and kth intervals. In such case, the applied over-booking gain in the next interval (k+1) is advantageously chosen to be equal to the minimum of the newly calculated over-booking gain and that which was applied in the interval k. This approach aims for protection against long lasting connections that have variable traffic patterns.

Long Term Statistics

Here the long-term statistics refer to the long-term averages of the ratio of declared mean and variance to estimated mean and variance, $M_k^d/\hat{M}_k$, $V_k^d/\hat{V}_k$. These values are used to predict the new connection mean and variance and the potential error on this predictions.

Over-booking Aggressiveness Adjustment

The over-booking aggressiveness can be adjusted by multiplying the over-booking gain by a factor $\beta \in [0,b]$. Two ranges of $\beta$ can be considered. If b=1 the aggressiveness factor serves only to protect system against CAC adjustment model errors. If b>1 the aggressiveness factor can also serve to compensate for the nominal CAC model conservatism (objective OB3). Aggressiveness adjustments can be performed by an operator or using the learning algorithm described briefly in the remainder of this section and more fully in the incorporated application entitled Learning-Based CAC Adjustment in ATM Networks. To simplify the presentation we assume one service class in the system. The learning algorithm is fed by measurements of the aggregate process cell loss ratio (e.g. over periodic 15 minute intervals). Also, the learning algorithm is supplied with information as to whether the link capacity is fully utilized in terms of effective bandwidth. Then, starting from some initial value, e.g. $\beta$=1, the over-booking factor is increased by a small value called $step_{up}$ (e.g. $step_{up}$=0.005) after each day during which the cell loss ratio did not exceed a given constraint in any of the 15 minute intervals and the link bandwidth was fully utilized in some period of the time. The over-booking factor remains the same if the link was not fully utilized during the whole day. In the case of cell loss ratio exceeding the threshold in a 15-minute interval, the over-booking factor is decreased by a large $step_{down}$ (e.g. $step_{down}$=0.1). Such adjustments permit a testing for incrementally increased available bandwidth and a large decrease when experience indicates that prior increases led to a violation of the cell-loss threshold.

Numerous and varied other methods and systems for tuning CAC performance in ATM networks within the scope and spirit of the present invention will occur to those skilled in the art in light of the present teachings.

Those skilled in the art will in some cases seek to modify the nominal CAC model to incorporate teachings of the present invention, e.g., to directly calculate the effective bandwidth based on the estimated mean and variance measurements. While incorporation of the present inventive teachings in the basic CAC algorithm is technically feasible, the separation of CAC adjustment from the nominal CAC model and processing often proves to be more convenient from an implementation and testing viewpoint. In particular, such a separate approach does not modify the already-tested nominal CAC model. Also, the calculated nominal effective bandwidth provides a convenient benchmark for the calculated relative over-booking gain.

While the term Connection Admission Control has been associated with the acronym CAC, this acronym is also used with the term Call Admission Control; such different usage connotes no difference of meaning in application of the present invention—the two terms may be used interchangeably. In each case the reference is to the admission, or not, of new (or renegotiated) virtual connections.

While ATM systems have been used to illustrate the principles of the present invention, those skilled in the art will find application of these teachings in other particular admission control contexts.

What is claimed is:

1. In a packet communications switch, a method for adjusting a connection admission control (CAC) process, the method comprising, for a current time interval:
   measuring at least one traffic parameter for existing connections,
   receiving connection declaration information for existing connections,
   determining an overbooking gain based on a model of communications traffic at said switch, and a function of said at least one traffic parameter, and said declaration information, and
   adjusting said CAC process based on said overbooking gain.

2. The method of claim 1 wherein said packet communications switch is a cell communications switch operating in accordance with one or more ATM protocols.

3. The method of claim 1 wherein said adjusting comprises increasing the number of connections admitted by said CAC.

4. The method of claim 1 wherein said adjusting comprises increasing the bandwidth available for connections admitted by said CAC.

5. The method of claim 1 wherein said at least one traffic parameter is selected from a group of traffic parameters comprising cell rate and cell loss rate.

6. The method of claim 1 wherein said function of said parameters comprises a function of estimates of at least one of the mean and variance of said traffic parameters.

7. The method of claim 1 wherein said current time interval is of duration less than approximately one second.

8. The method of claim 7 wherein said declaration information comprises Quality of Service statements.

9. The method of claim 6 wherein said model is based on long term statistics for connections in said switch, and wherein said estimates are based on said long term statistics.

10. The method of claim 1 wherein said adjusting is modified in accordance with an aggressiveness adjustment.

11. The method of claim 10 wherein an operator makes said aggressiveness adjustment.

12. The method of claim 10 wherein said aggressiveness adjustment is made in accordance with a learning model reflecting actual performance of said switch.

13. The method of claim 12 wherein said learning model reflects the number of lost cells over a plurality of time intervals.

14. The method of claim 6 wherein said estimates of mean and variance are performed in a Kalman filtering process.

15. The method of claim 7 wherein said switch comprises a number of output ports and said adjusting said CAC process is performed for at least one of said ports.

16. The method of claim 1 wherein said switch comprises a number of output ports, said switch providing multiple-priority traffic on at least one of said output ports, and said adjusting is performed separately for traffic of each priority for said at least one of said output ports provided with multiple-priority traffic.

17. A connection-based packet communications switch comprising a plurality of input ports and a plurality of output ports, a connection admission control (CAC) system for controlling the admission of connections through said switch, said connections characterized by at least one connection declarations, means for measuring at least one traffic parameter at said switch, means for determining an overbooking gain based on a model for traffic in said switch, said at least one declaration and said at least one traffic parameter, means for adjusting said CAC system in accordance with said overbooking gain.

18. The switch of claim 17 further comprising means for determining long-term statistics for connections in said switch, said model being further based on said long term statistics for connections in said switch.

* * * * *